Figure 1:
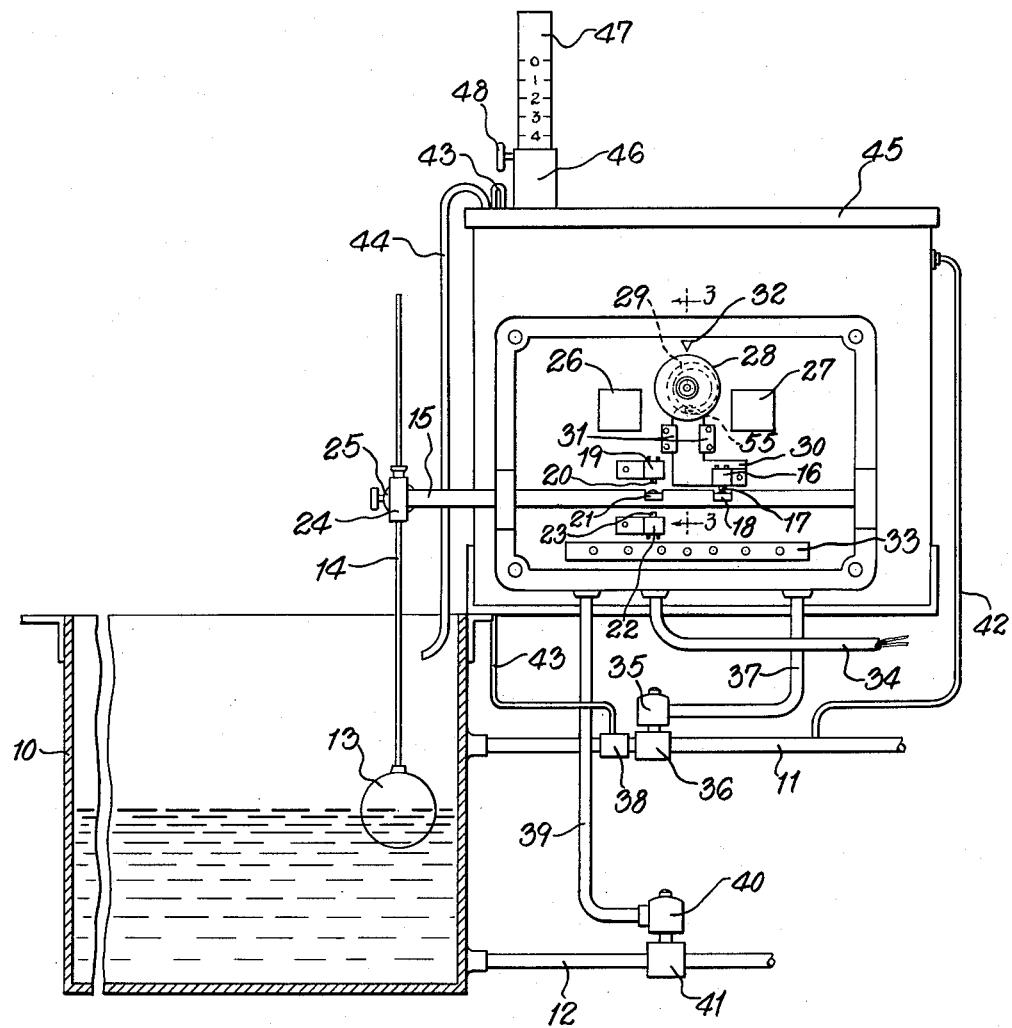

May 30, 1961 F. F. PINTZ 2,986,154
WATER TREATMENT DEVICE
Filed June 15, 1956 3 Sheets-Sheet 1

INVENTOR.
FREDERICK F. PINTZ
BY
Cyrus D. Samuelson
ATTORNEY

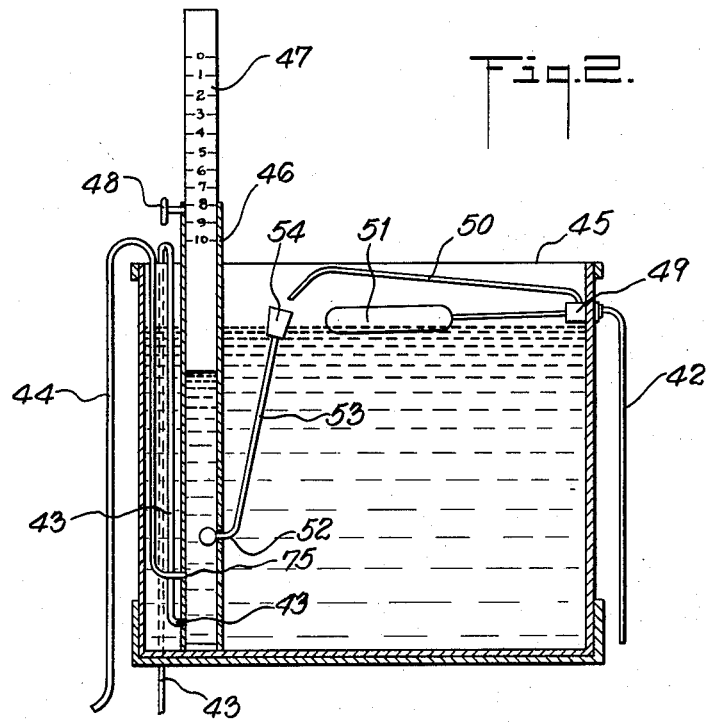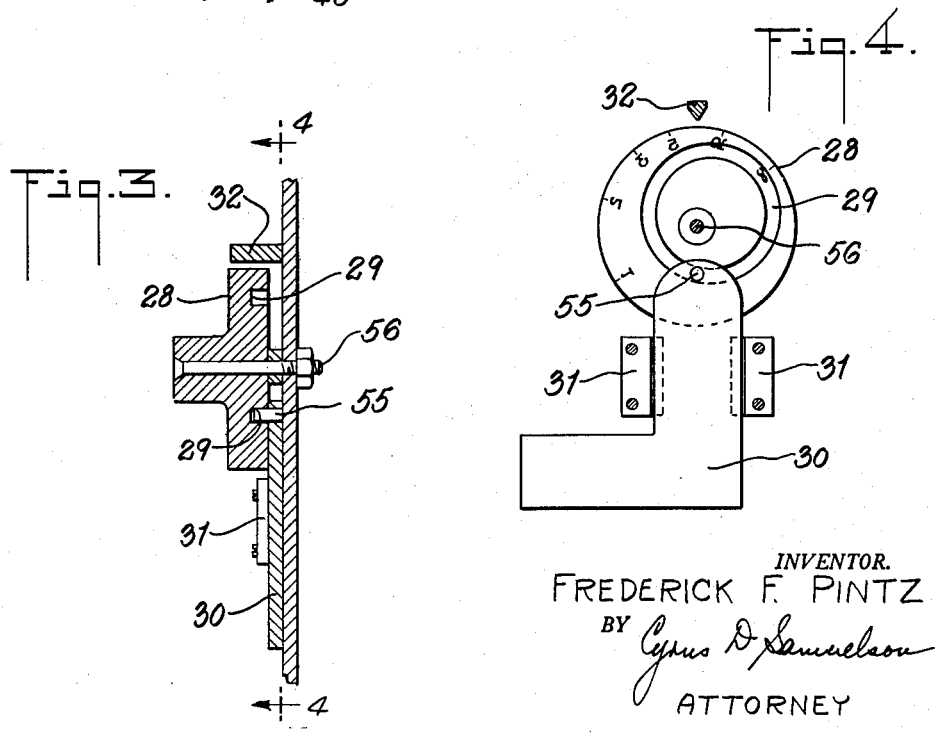

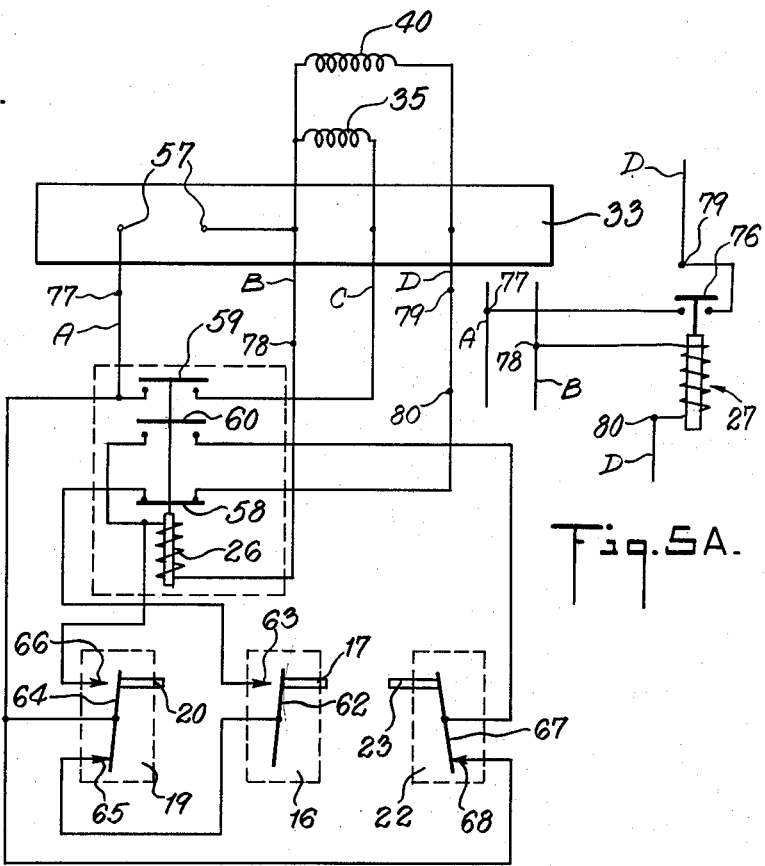
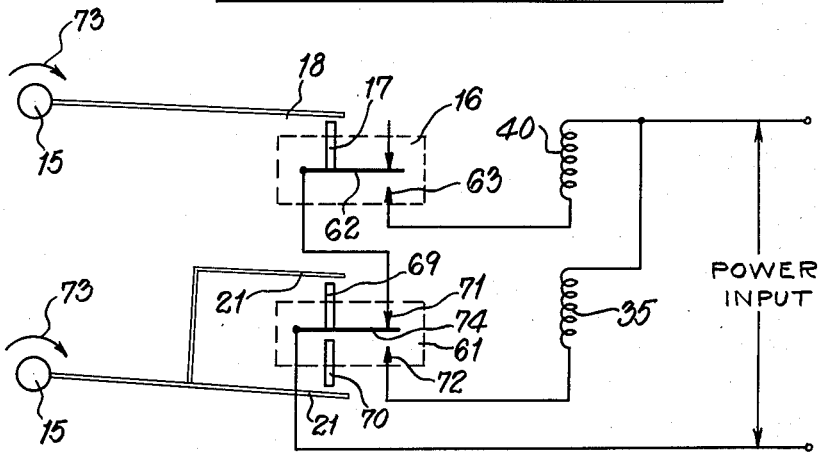

United States Patent Office 2,986,154
Patented May 30, 1961

2,986,154
WATER TREATMENT DEVICE
Frederick F. Pintz, Leonia, N.J., assignor to Heller Laboratories, Inc., Leonia, N.J., a corporation of New Jersey
Filed June 15, 1956, Ser. No. 591,699
19 Claims. (Cl. 137—132)

My invention relates to a water treatment device and in particular to a device for controlling the mineral concentration in a water system by means of differential level control.

By the term water treatment I mean the control of the mineral concentration in the water system and/or the addition of chemicals for modifying the characteristics of the water in the system.

Water treatment devices for the control of the mineral concentration in the water system have been used for many years. All of these prior art devices possessed one or more of certain essential defects. These defects were: waste water because constant bleed-off was employed; inaccurate control of the mineral concentration because the rate and amount of bleed-off was manually controlled; waste of chemical additives because of the addition of extra quantities of make-up water; inaccurate control of percentage of chemical additives because of lack of control of bleed-off; along with many others.

Accordingly, it is a principal object of my invention to provide a device for controlling the mineral concentration in a water system, accurately and economically.

It is a further object of my invention to provide a device for controlling the concentration of chemical additives in a water system.

Other objects and advantages of my invention will be apparent during the course of the following description.

In the accompanying drawings, forming a part of this application, and in which like numerals are employed to designate like parts throughout the same, Figure 1 is a front elevational view of a preferred embodiment of my invention, with the cover of the control unit removed, Figure 2 is a front elevational view, partly in cross-section of a chemical additive tank of my invention, Figure 3 is a cross-sectional view along the line 3—3 of Figure 1, Figure 4 is a cross-sectional view along the line 4—4 of Figure 3, Figure 5 is an electrical schematic diagram of a preferred form of control circuit, utilized in my invention, Figure 5A is a supplemental electrical schematic diagram to Figure 5 showing an alternative bleed-off relay which is utilized when the head of pressure is too great, and Figure 6 is an electrical schematic diagram of a modified form of control circuit, utilized in my invention.

In the drawings, wherein for the purpose of illustration are shown preferred embodiments of my invention, the numeral 10 designates the pan of a water system which is fed with make-up water through line 11 and which is bled-off or drained through line 12. Float 13 floats on the liquid in 10 and its movement on the liquid surface moves float stem 14 which is yoked by means of float stem yoke 25 and float shaft yoke 24 to float shaft 15. Bleed-off control switch 16 is equipped with bleed-off control switch contactor 17 which is actuated by bleed-off control contact arm 18 which is suitably affixed to 15.

Make-up control switch 19 is equipped with make-up control switch contactor 20 which is actuated by make-up control contact arm 21 which is suitably affixed to 15. 21 also actuates cut-off control switch contactor 23 which is a part of cut-off control switch 22. Make-up control relay 26 is operated by circuitry controlled by 19 and 22 and bleed-off control relay 27 is interlocked with the operation of 26. In many installations, where the head of pressure, and consequently the power required is low enough, the bleed-off valve 40 can be directly operated so that 27 is not necessary.

Control dial 28 rotates on shaft 56 and is equipped with eccentric channel 29 into which is fitted pin 55. Pin 55 is attached to adjustable mounting 30 which moves within runners 31 and raises or lowers 16 depending on the position of 28. 28 is marked with suitable indicia (as shown in Figure 4) which are used in conjunction with indicator 32 so that it is easy to calibrate the position of 16 in terms related to the mineral concentration of the water. This setting is determined by the characteristics of the make-up water.

Terminal strip 33 serves to make the electrical wiring and connections accessible for simplified manufacture and maintenance. Power is brought into the unit by means of cable 34. Make-up control cable 37 carries the electrical wiring to make-up control valve solenoid 35 which operates make-up control valve 36. Make-up orifice fitting 38 operates on pressure differential and feeds some water during make-up through the siphon nozzle line 43. If necessary, a valve may be inserted in line 43 in order to control the flow in 43. Bleed-off control cable 39 carries the electrical wiring to bleed-off control valve solenoid 40 which operates bleed-off control valve 41.

Chemical tank 45 is filled with the proper amount of chemicals (not shown) and is kept filled with water through line 42. Siphon tube 44 adds a fixed volume of saturated chemical solution to pan 10 during make-up. Chemical measuring pipe 46, calibrated feed rod 47 and adjustment screw 48 combine to set the amount of chemical concentrate siphoned through 44 during make-up.

Water from 42 feeds through nozzle 50 into 45 until float 51 reaches the level at which valve 49 cuts off the flow. Refill orifice 52 is kept clean by non-clog pin 53 which is kept in motion by the bobbing of float 54.

In Figure 5, the power input terminals are designated by 57, the bleed-off contactor by 58, the make-up contactor by 59 and the holding contactor by 60. Bleed-off switch arm 62 and switch contact 63 are normally open. Make-up switch arm 64 and switch contact 65 are normally closed and 64 and switch contact 66 are normally open. Cut-off switch arm 67 and switch contact 68 are normally closed. Figure 5 is illustrative of a preferred embodiment of my invention wherein I do not employ bleed-off control relay 27. 27 need only be used when the head of pressure is high. In most installations, the current required to operate 40 is low so that a low current switch may be used without a relay. Where the head of pressure and consequently, the current is too high, relay 27 is connected as shown in Figure 5A and used to operate 40.

In Figure 6, which is illustrative of a simplified embodiment of my invention wherein 40 and 35 may be operated by low currents, 61 is the combined make-up-cut-off control switch and comprises make-up switch contactor 69, cut-off switch contactor 70, switch contacts 71 and 72, and switch contact arm 74. Arrows 73 indicate the direction of the rotation of shaft 15 during evaporation and bleed-off.

75 in Figure 2 designates the siphon tube inlet. In Figure 5A, 76 designates the bleed-off relay contact. In Figures 5 and 5A, 77 designates a contact point on line A, 78 designates a contact point on line B, and 79 and 80 designate contact points on line D. There are no contact points on line C.

In water systems, which are used for air conditioning and similar purposes, it is necessary to keep the concentration of natural minerals down below a predetermined limit. This limit is determined by the point at which a concentration greater than the limit will cause deleterious effects in the system. By natural minerals, I mean all those chemical compositions, mixtures and elements which are in solution in the water and are delivered to the system by the city well or other basic water supplier. Some of the minerals, which are contained in the average water supply, are the carbonates, the bicarbonates, the sulphates, and the silicates. Calcium sulphate, for example, is the cause of heavy scale formation and its concentration must be kept below a given limit. Other minerals, which also have some effect on the system's operation or maintenance, should be controlled in concentration.

During evaporation, the water is removed from the water tower or pan and the minerals remain in the water tower or pan so that when more water is added, the mineral concentration increases. After several cycles of such operation, called make-up, the mineral concentration may become high enough to have degrading effect on the system. If no attempt is made to reduce the mineral concentration, the system will not last long in good operating condition.

The way to reduce the mineral concentration is to drain or bleed-off a portion of the water remaining in the water tower or pan, which action removes both water and minerals. Some presently known systems use constant bleed-off, whether or not it is necessary, which requires more make-up and a consequent greater use of water. Other presently known systems use manually controlled bleed-off which is inaccurate and non-automatic since it is necessary to have personnel available for the bleed-off operation. On some days, when there is little evaporation, it is not necessary to bleed-off as much of the concentrated solution as it is on days in which there is a great deal of evaporation.

My invention provides a device for accurately controlling the mineral concentration of a water system based on the ratio of the make-up to the bleed-off. It maintains a fixed range of mineral concentration, based on the mineral content of the original make-up water, precisely as required to maintain good system operation with a minimum of repair and maintenance.

My invention is also utilized to add chemicals at a fixed concentration whenever make-up water is added to the system. The chemicals to be added may be placed in a single chemical tank or a separate chemical tank may be utilized for each chemical additive or more than one tank may be used, some with one chemical additive and some with several. The chemicals, which are most commonly required to be added to water systems, are sodium chromate, caustic soda, sodium phosphates, and algaecides such as copper sulphate and sodium pentachlorophenate. Other chemical additives may be utilized under certain special conditions. The sodium chromate forms a protective film over the metal surface of the system and prevents corrosion due to free carbon dioxide and oxygen in the system. The other chemicals are used as water softeners or for other purposes. In some systems control of mineral concentration only may be required. In such systems it is not necessary to add chemicals and it is within the scope of my invention to use the mineral concentration control without the addition of chemicals to the water sysem.

In operation, as the level of the water in 10 is lowered due to evaporation, float 13 is lowered, thereby causing shaft 15 to rotate counterclockwise, when viewed from the left side of Figure 1. The movement of float 13 moves float stem 14 which is yoked to shaft 15 by means of yokes 24 and 25 and a shaft which is perpendicular to both stem 14 and shaft 15. Since all these elements are rigidly connected, movement of float 13 up and down will cause shaft 15 to rotate clockwise and counterclockwise, respectively. When the level, at which bleed-off should take place is reached, 18 makes contact with 17. The distance of 17 from 18 is adjusted by means of dial 28 and may vary from being the same as the distance between 20 and 21 to any distance less than the distance from 20 to 21. If 17 and 20 are the same distance from 18 and 21 respectively, and contact is made between 17 and 18 at the same time as contact is made between 20 and 21, there will be no bleed-off. The greater the period of time between the closing of 17—18 and 20—21, the greater will be the bleed-off.

When 18 makes contact with 17 with sufficient pressure to actuate it, the circuit is closed between 62 and 63 (Figure 5). This closes the circuit through 40 and causes current to flow. The circuit runs from the left terminal 57 through 64—65 (normally closed), through 62—63 (closed by 18—17), through contactor 58 (normally closed), through 40 to right terminal 57. The current through 40 opens valve 41 and water is bled off from the system through line 12.

Float 13 continues to be lowered as the water level is lowered due to the bleed-off operation until 21 makes contact with 20 sufficient to actuate switch 19. Contact 64—65 is opened, stopping the current flow in 40, thereby closing valve 41 and stopping the bleed-off. Contact 64—66 is closed, actuating relay 26, closing the circuit through 35 and causing current to flow. One circuit runs from left terminal 57 through 64—66, coil of relay 26 to right terminal 57, causing 58 to open and 59 and 60 to close. A second circuit runs from left terminal 57, through 67—68 (normally closed), through 60, through coil of relay 26 back to right terminal 57. This second circuit is the holding circuit and keeps current flowing in 35 after contact 64—66 is opened due to the removal of contact between 21 and 20. A third circuit runs from left terminal 57, through 59, through 35 to right terminal 57. The current through 35 opens valve 36 and water flows into 10 from line 11.

As the water in 10 rises, 13 rises and causes shaft 15 to rotate clockwise as viewed from the left of Figure 1 and the contacts between 20 and 21 and 18 and 17 are broken. Because of the holding circuit through 67—68 etc., the circuit through 35 remains closed and make-up continues to be added to 10.

The water rises in 10 until it reaches a point at which the rotation of 15 causes 21 to make contact with 23 with sufficient pressure to actuate switch 22. This action opens 67—68 and stops the flowing of current in 35, thereby closing valve 36.

When the head of pressure in 10 is high, it is necessary to utilize a high current valve solenoid control 40. In such a case, the switch 16 may not be able to carry the current. Figure 5A illustrates the manner in which bleed-off relay 27 is electrically connected in the circuit of Figure 5. The relay contactor 76, when actuated, closes the circuit between points 77 on line A and 79 on line D. One side of the relay coil is connected to 78 on line B and the other side is connected to point 80 on line D. Line D is opened between 79 and 80 when relay 27 is used. The bleed-off operation with relay 27 is the same as that described above except that the high current through solenoid control valve 40 does not flow through the sensitive low current switches 16 and 19.

Figure 6 illustrates, diagrammatically, a simplified electrical control circuit for use in installations which have solenoid valve controls with low current requirements. When shaft 15 rotates in the direction shown by arrows 73; 18 makes contact with 17 with sufficient pressure to close 62—63. This causes current to flow from the power input through the circuit 40, 63—62 and 71—74 (normally closed), thereby opening valve 41 to bleed off from 10 through 12. Upon further rotation of 15 in the direction of 73, 21 makes contact with 69 with sufficient pressure to push 74 away from 71 and in contact with 72. This opens the circuit through 40 and closes valve 41. It also closes the circuit through 35 and 72—74, thereby causing current to flow in 35 and opening valve 36. Make-up water is now fed into 10 from 11.

Float 13 starts to rise and 15 rotates in the direction opposite to arrows 73. Switch 61 remains so that 72—74 is closed until 21 makes contact with 70 with sufficient pressure to open 72—74 and close 71—74. Normally 62—63 opens due to the removal of the pressure of 18 on 17 before 72—74 opens and 71—74 closes due to the pressure of 21 on 70. If this were not done, there would be continuous bleed-off which may be used in some installations but is not generally necessary. The system is now ready for another evaporation cycle.

Dial 28 is calibrated with indicia (as shown in Figure 4) related to the mineral concentration. In Figure 4, the numerals are viewed from the back of the dial 28. 28 is rotated about 56 to the mark desired and determined from water analysis of the make-up supply and serves to move 16 nearer to or further from 18 depending on the required ratio of make-up to bleed-off. Eccentric channel 29 moves pin 55 vertically thereby carrying 30 up and down, as required. Other methods of dial control of the vertical movement and setting of the position of 30 and 16 may also be employed.

When necessary, one or more chemical tanks 45 are used to store chemicals in solution. This chemical concentrate is added to the contents of 10 during make-up. Water flows in pipe 42 from 11 and fills 45 through 50 until float 51 reaches the correct level, at which time valve 49 cuts off the flow from 42 into 50. Chemicals are added to 45 by any suitable method (not shown). All chemicals may be added in a single tank or separate tanks, equipped with similar filling, siphon feed and measuring means and actuated from a single orifice make-up fitting 38, may be used for each chemical. The use of more than one tank is often advisable because of the variance in concentration required for the several chemical additives.

Water from 45 enters 46 through orifice 52 which is kept unclogged by 53 which moves in 52 due to the motion of 54. The amount of chemical solution water in 46 is determined by the setting of rod 47; the further down 47 is, the less solution will be used. 47 is held in place by means of adjustment 48 and indicia on 47 arbitrarily indicate the volume of chemical additives according to prior calibration, the size of 45 and the type and amount of chemicals added. Some chemicals may be added to 45 to maintain a saturated solution while other chemicals may be added so as to maintain a less than saturated solution.

During make-up, water flows through orifice 38 which is so constructed and adjusted that sufficient pressure exists on the upstream side to force water through 43 into 46. When the level in 46 is above the level at the top of 44, chemical solution water from 46 is carried through 44 to 10. The level of the liquid in measuring pipe 46 can rise above the level of siphon 44 because feed rod 47 is loose enough in pipe 46 to permit the liquid to flow up around the rod but is tight enough in the pipe so that it does not slip down. Orifice 52 allows very slow refilling of 46 while the siphon action of 44 is rapid so that 46 is drained much faster than it is refilled through 52. When the level in 46 reaches 75 the siphon is broken by entrance of air into the siphon tube 44 and the chemical feed stops. Normally make-up will stop before 46 is refilled so that the siphon will not be initiated until the next cycle.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. An automatic water system controller comprising means for determining the amount of water evaporated from the system, means for bleeding off a specified amount of water from the system when the predetermined amount of water has evaporated from the system, means for determining the amount of water bled off from the system, means for adding a specified amount of water to the system when the predetermined amount of water has been bled off from the system, means for adjustably setting the ratio of the water evaporated to the water bled off, and control means carrying indicia thereon coupled to said ratio adjusting means such that the said ratio is constant for each such setting of said control means.

2. An automatic water system controller as described in claim 1 including means for adding a specified amount of chemical solution to said system, said means for adding a specified amount of chemical solution being actuated concurrently with said means for adding water to the system.

3. An automatic water system controller comprising a water pan, a float, a rotatable arm, contacting means, liquid removing means, liquid adding means, said float being inserted in the liquid in said water pan and being of such average density as to remain on the surface of said liquid, said float being mechanically connected to said rotatable arm which carries said contacting means, said contacting means actuating said liquid removing means when said float is at a first predetermined level in said pan, said contacting means deactuating said liquid removing means and actuating said liquid adding means when said float is at a second predetermined level in said pan, said contacting means deactuating said liquid adding means when said float is at a third predetermined level in said pan, said third predetermined level being the uppermost of said levels, said second predetermined level being the lowermost of said levels, and selecting means for selecting the position of said first predetermined level, said selecting means being adjustable to select any level for said first predetermined level from said second predetermined level through said third predetermined level.

4. An automatic water system controller as described in claim 3 wherein said liquid removing means comprises a switch and a valve actuated by said switch.

5. An automatic water system controller as described in claim 3 wherein said liquid removing means comprises a switch, a second switch actuated by said switch and a valve actuated by said second switch.

6. An automatic water system controller as described in claim 3 wherein said liquid adding means comprises a switch and a valve actuated by said switch.

7. An automatic water system controller as described in claim 6 wherein said contacting means deactuating said liquid adding means comprises a second switch which deactivates said switch and valve.

8. An automatic water system controller as described in claim 3 wherein said liquid adding means comprises a switch, a solenoid actuated by said switch and a valve actuated by said solenoid.

9. An automatic water system controller as described in claim 8 wherein said contacting means deactuating said liquid adding means comprises a second switch which deactivates said switch, solenoid and valve.

10. An automatic water system controller as described in claim 3 wherein chemical adding means are actuated when said float is at said second predetermined level.

11. An automatic water system controller as described in claim 3 wherein said selecting means comprises a rotatably mounted dial, a movable mounting cooperatively engaging said rotatably mounted dial, a switch mounted on said movable mounting and cooperatively placed so as to be actuated by said contacting means affixed to said rotatable arm, the position of said movable mounting being adjusted by the position of said rotatably mounted dial.

12. An automatic water system controller as described in claim 3 wherein said selecting means comprises a rotatably mounted dial carrying an eccentric channel therein, a movable mounting, a pin attached to one end of said movable mounting, said pin being mounted such that it rides in said eccentric channel, a switch mounted on said movable mounting at the other end thereof, and cooperatively placed so as to be actuated by said contacting means affixed to said rotatable arm, the position of said movable mounting being adjusted by the position of said rotatably mounted dial.

13. An automatic water controller system comprising a water pan; a float, said float being inserted in the liquid in said water pan and being of such average density as to remain on the surface of said liquid; a rotatable arm mechanically connected to said float such that said arm is rotated in one direction about its axis when said float is lowered and in the other direction when said float is raised; a first contact, a second contact and a third contact mounted on said rotatable arm; a first switch, a second switch and a third switch mounted such that they are mechanically actuated by said contacts; a first electrical circuit and a second electrical circuit; a first valve and a second valve, said first valve controlling the removal of liquid from the system and said second valve controlling the adding of liquid to the system, said first valve being controlled by said first electrical circuit and said second valve being controlled by said second electrical circuit; said first contact cooperating with said first switch, said second contact cooperating with said second switch, said third contact cooperating with said third switch; a first predetermined liquid level in said pan, a second predetermined liquid level in said pan, a third predetermined liquid level in said pan, said third predetermined liquid level being the uppermost, said second predetermined liquid level being the lowermost and said first predetermined liquid level being any level from said second predetermined liquid level through said third predetermined liquid level; means for setting the positions of said predetermined liquid levels; when said float is at said first predetermined liquid level, said first contact actuating said first switch, said first switch closing said first electrical circuit, said first electrical circuit opening said first valve whereby liquid is removed from said pan; when said float is at said second predetermined liquid level, said second contact actuating said second switch, said second switch opening said first electrical circuit thereby closing said first valve whereby the removal of liquid from the pan is stopped and closing said second electrical circuit, said second electrical circuit opening said second valve whereby liquid is added to the pan; when said float is at said third predetermined liquid level, said third contact actuating said third switch, said third switch opening said second electrical circuit thereby closing said second valve whereby the adding of liquid to the pan is stopped.

14. An automatic water system controller as described in claim 13 wherein said means for setting the positions of said predetermined liquid levels in said pan includes means for adjusting the position of said first switch such that said first predetermined liquid level may be selected at any level from that of said second predetermined liquid level through said third predetermined liquid.

15. An automatic water system controller as described in claim 14 wherein said means for adjusting the position of said first switch comprises a rotatably mounted dial, a movable mounting cooperatively engaging said rotatably mounted dial, said first switch being mounted on said movable mounting, the position of said movable mounting being adjusted by the position of said rotatably mounted dial.

16. An automatic water system controller as described in claim 14 wherein said means for adjusting the position of said first switch comprises a rotatably mounted dial having an eccentric channel therein, a movable mounting, a pin attached to one end of said movable mounting, said pin being mounted such that it rides in said eccentric channel, said first switch being mounted on the other end of said movable mounting from said pin whereby the position of said first switch is changed when said dial is rotated.

17. An automatic water system controller as described in claim 13 wherein chemical adding means are actuated when said float is at said second predetermined liquid level.

18. A chemical adding tank for a water system comprising a tank; liquid with chemicals in solution in said tank; a container within said tank carrying an opening connected therewith such that said liquid with chemicals in solution is fed from said tank to said container; a calibration rod within said container which governs the amount of liquid with chemicals in solution which enters said container from said tank; a pipe for feeding fresh water connected to said container; a siphon connected to said container, the connection of said pipe to said container being lower than the connection of said siphon to said container; and means for adding fresh water to said tank when the level therein is below a fixed predetermined value; said opening carried by said container being such that fresh water entering said container from said pipe is restricted from entering said tank; said siphon being activated when the level of the liquid in said container is above the top of said siphon; such opening carried by said container being such that the flow of said liquid with chemicals in solution from said tank to said container is restricted when said siphon is activated.

19. A chemical adding tank for a water system comprising a tank; liquid with chemicals in solution in said tank; a container within said tank carrying an opening connected therewith such that said liquid with chemicals in solution is fed from said tank to said container; a calibration rod within said container which governs the amount of liquid with chemicals in solution which enters said container from said tank; a pipe for feeding fresh water to said container; a siphon connected to said container; and means for adding fresh water to said tank when the level therein is below a fixed predetermined value; said opening carried by said container being such that fresh water entering said container from said pipe is restricted from entering said tank; said siphon being activated when the level of liquid in said container is above the top of said siphon; said opening carried by said container being such that the flow of said liquid with chemicals in solution from said tank to said container is restricted when said siphon is activated.

References Cited in the file of this patent

UNITED STATES PATENTS

| | | |
|---|---|---|
| 1,002,974 | Dunkley | Sept. 12, 1911 |
| 1,497,701 | Schreier | June 17, 1924 |
| 1,998,478 | Williams | Apr. 23, 1935 |
| 2,625,933 | Salisbury | Jan. 20, 1953 |
| 2,758,716 | Oswald | Aug. 14, 1956 |
| 2,792,912 | Kangas | May 21, 1957 |